(12) United States Patent
Ko et al.

(10) Patent No.: US 7,703,925 B2
(45) Date of Patent: Apr. 27, 2010

(54) MINIATURE PROJECTOR MODULE HAVING EFFECTIVE UTILIZATION OF LIGHT WITH TWO POLARIZATIONS

(75) Inventors: Shin-Bin Ko, Taipei (TW); Liang-Shu Wang, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 1064 days.

(21) Appl. No.: 11/391,996

(22) Filed: Mar. 29, 2006

(65) Prior Publication Data

US 2007/0046896 A1 Mar. 1, 2007

(30) Foreign Application Priority Data

Aug. 24, 2005 (TW) .............................. 94128904 A

(51) Int. Cl.
*G03B 21/14* (2006.01)
*G03B 21/28* (2006.01)
*G02F 1/135* (2006.01)
*H04N 5/74* (2006.01)

(52) U.S. Cl. ..................... 353/20; 353/98; 353/119; 349/30; 348/758

(58) Field of Classification Search .................. 353/20, 353/98, 119; 349/30; 348/758
See application file for complete search history.

(56) References Cited

U.S. PATENT DOCUMENTS

| 2004/0057019 A1* | 3/2004 | Sokolov ........................ 353/31 |
| 2004/0145703 A1* | 7/2004 | O'Connor et al. ............. 353/20 |
| 2006/0092380 A1* | 5/2006 | Salsman et al. ................ 353/20 |
| 2007/0211219 A1* | 9/2007 | Ko .............................. 353/52 |

* cited by examiner

*Primary Examiner*—Georgia Y Epps
*Assistant Examiner*—Magda Cruz
(74) *Attorney, Agent, or Firm*—Winston Hsu

(57) ABSTRACT

A miniature projector module includes: a light source unit capable of emitting source light with first and second polarizations; a polarization beam splitter capable of reflecting the source light with the first polarization, and permitting transmission of the source light with the second polarization therethrough; a first image modulator capable of converting the source light with the first polarization reflected by the beam splitter into image light with the second polarization, and directing the image light with the second polarization toward the beam splitter for further transmission therethrough; a second image modulator capable of converting the source light with the second polarization transmitted through the beam splitter into image light with the first polarization, and directing the image light with the first polarization toward the beam splitter for further reflection thereby; and a projector lens for receiving and projecting the image light from the beam splitter.

18 Claims, 3 Drawing Sheets

MINIATURE PROJECTOR MODULE HAVING EFFECTIVE UTILIZATION OF LIGHT WITH TWO POLARIZATIONS

CROSS-REFERENCE TO RELATED APPLICATION

This application claims priority of Taiwanese Application No. 094128904, filed on Aug. 24, 2005.

BACKGROUND OF THE INVENTION

1. Field of the Invention

The invention relates to a projector module, more particularly to a miniature projector module for application to handheld electronic devices.

2. Description of the Related Art

As shown in FIG. 1, in Taiwanese patent no. 232995, there is disclosed a mobile phone that is equipped with a conventional miniature projector module 1. The conventional miniature projector module 1 includes a semiconductor light source unit 11, a polarization beam splitter 12, a reflective image modulator 13, and a projector lens 14.

The light source unit 11 is capable of emitting red, green and blue source light with first and second polarizations in sequence. The polarization beam splitter 12 is capable of reflecting the source light with the first polarization, and permits transmission of the source light with the second polarization therethrough. The reflective image modulator 13 is disposed to receive and convert the source light with the first polarization reflected by the polarization beam splitter 12 into image light with the second polarization, and directs the image light with the second polarization toward the polarization beam splitter 12 for further transmission therethrough. The projector lens 14 is disposed to receive and project the image light with the second polarization from the polarization beam splitter 12.

The main drawback of the conventional miniature projector module 1 is that only the source light with the first polarization is utilized for image projection, and the source light with the second polarization is wasted. In other words, approximately half of the source light is lost, resulting in a reduction in the brightness of projected images.

SUMMARY OF THE INVENTION

Therefore, the object of the present invention is to provide a miniature projector module that improves upon source light utilization as compared to the prior art.

Another object of the present invention is to provide a miniature projector module that is provided with a mounting seat so as to be suitable for application to handheld electronic devices.

According to the present invention, there is provided a miniature projector module that includes a light source unit, a polarization beam splitter, first and second image modulators, and a projector lens. The light source unit is capable of emitting source light with first and second polarizations. The polarization beam splitter is capable of reflecting the source light with the first polarization, and permits transmission of the source light with the second polarization therethrough. The first image modulator is capable of converting the source light with the first polarization reflected by the polarization beam splitter into image light with the second polarization, and directs the image light with the second polarization toward the polarization beam splitter for further transmission therethrough. The second image modulator is capable of converting the source light with the second polarization transmitted through the polarization beam splitter into image light with the first polarization, and directs the image light with the first polarization toward the polarization beam splitter for further reflection thereby. The projector lens is disposed to receive and project the image light with the first and second polarizations from the polarization beam splitter.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
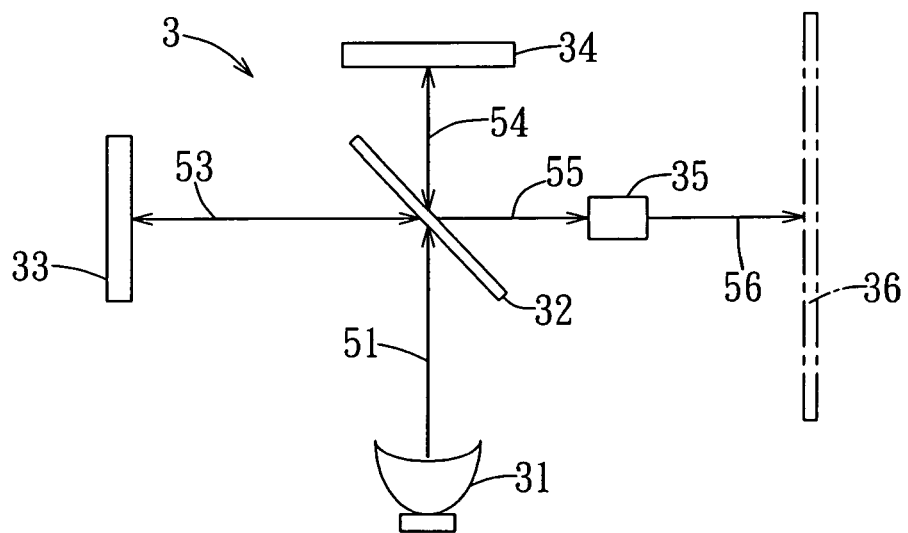
FIG. 2 is a schematic view of the preferred embodiment of a miniature projector module according to the present invention.

As shown in FIG. 2, the preferred embodiment of a miniature projector module 3 according to the present invention includes a light source unit 31, a polarization beam splitter 32, first and second image modulators 33, 34, and a projector lens 35.

The light source unit 31 is capable of emitting red, green and blue source light with first and second polarizations along path 51 in sequence. In this embodiment, the first polarization is the P-state polarization, while the second polarization is the S-state polarization. However, the first and second polarizations can be the S— and P-state polarizations instead in other embodiments of the present invention.

The polarization beam splitter 32 is disposed on the path 51 to receive the source light with the first and second polarizations. The polarization beam splitter 32 is capable of reflecting the source light with the first polarization along path 53, and permits transmission of the source light with the second polarization therethrough along path 54.

The first image modulator 33 is disposed on the path 53, is capable of converting the source light with the first polarization reflected by the polarization beam splitter 32 into image light with the second polarization, and directs the image light with the second polarization along the path 53 toward the polarization beam splitter 32 for further transmission therethrough along path 55.

The second image modulator 34 is disposed on the path 54, is capable of converting the source light with the second polarization transmitted through the polarization beam splitter 32 into image light with the first polarization, and directs the image light with the first polarization along the path 54 toward the polarization beam splitter 32 for further reflection thereby along the path 55. Therefore, the image light with the first and second polarizations travels along the path 55.

The projector lens 35 is disposed on the path 55 to receive and project the image light with the first and second polarizations from the polarization beam splitter 32 along path 56 toward a screen 36.

Figure 1:
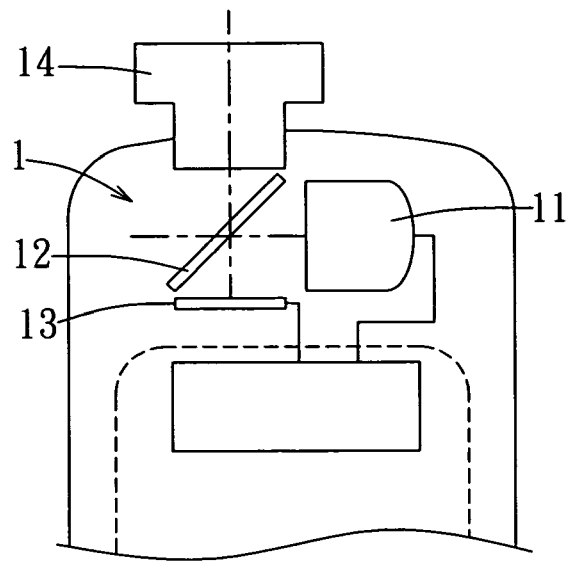
FIG. 1 is a fragmentary schematic view of a mobile phone equipped with a conventional miniature projector module.

By including the first and second image modulators 33, 34 in the miniature projector module 3, the source light with the first and second polarizations is converted into the image light with the second and first polarizations, which is eventually utilized in projecting images onto the screen 36. As a result, the source light utilization of the miniature projector module 3 is greatly increased as compared to the conventional miniature projector module 1 (shown in FIG. 1).

Figure 3:
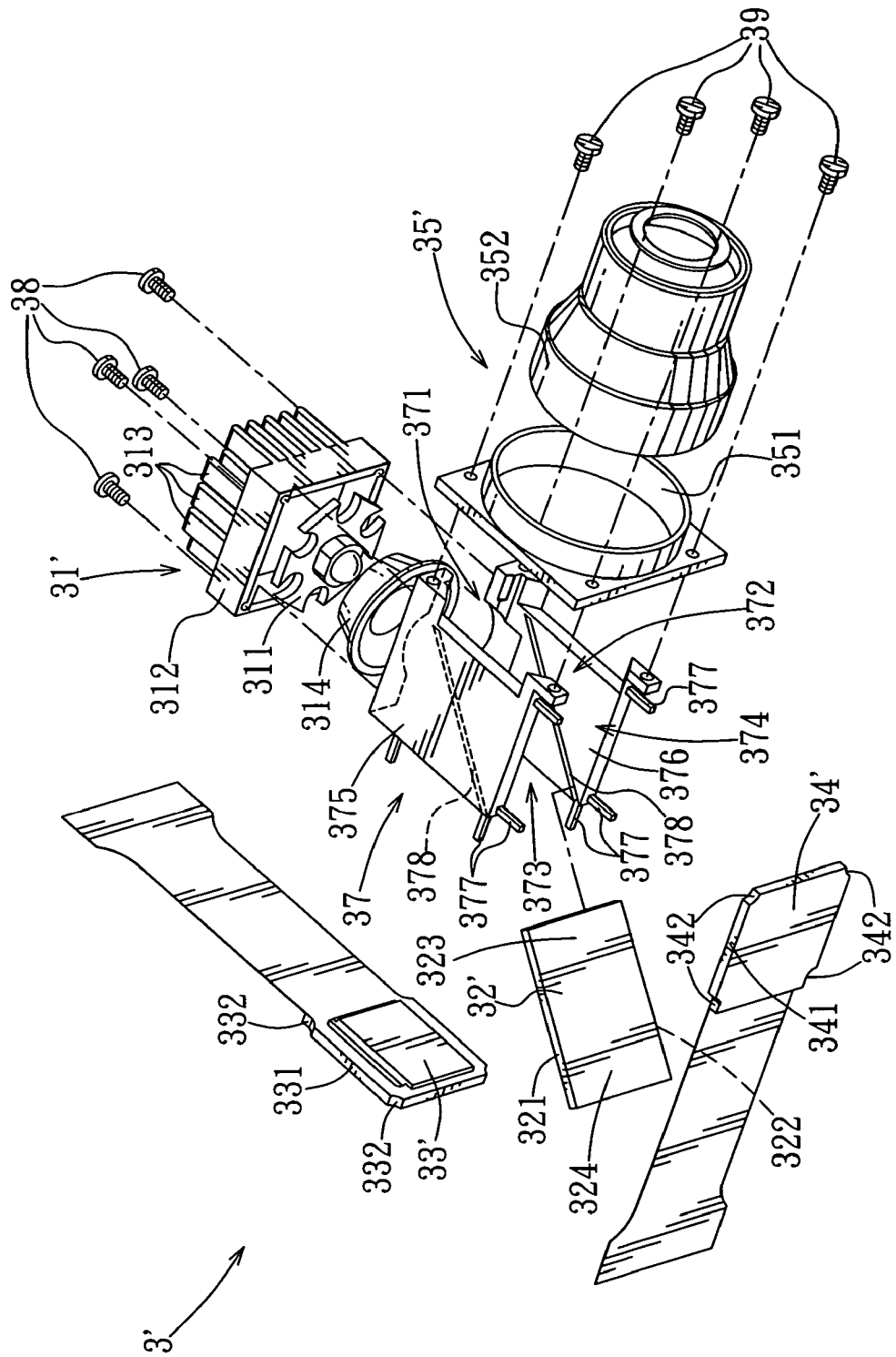
FIG. 3 is an exploded perspective view of a modified miniature projector module according to the preferred embodiment.
Figure 4:
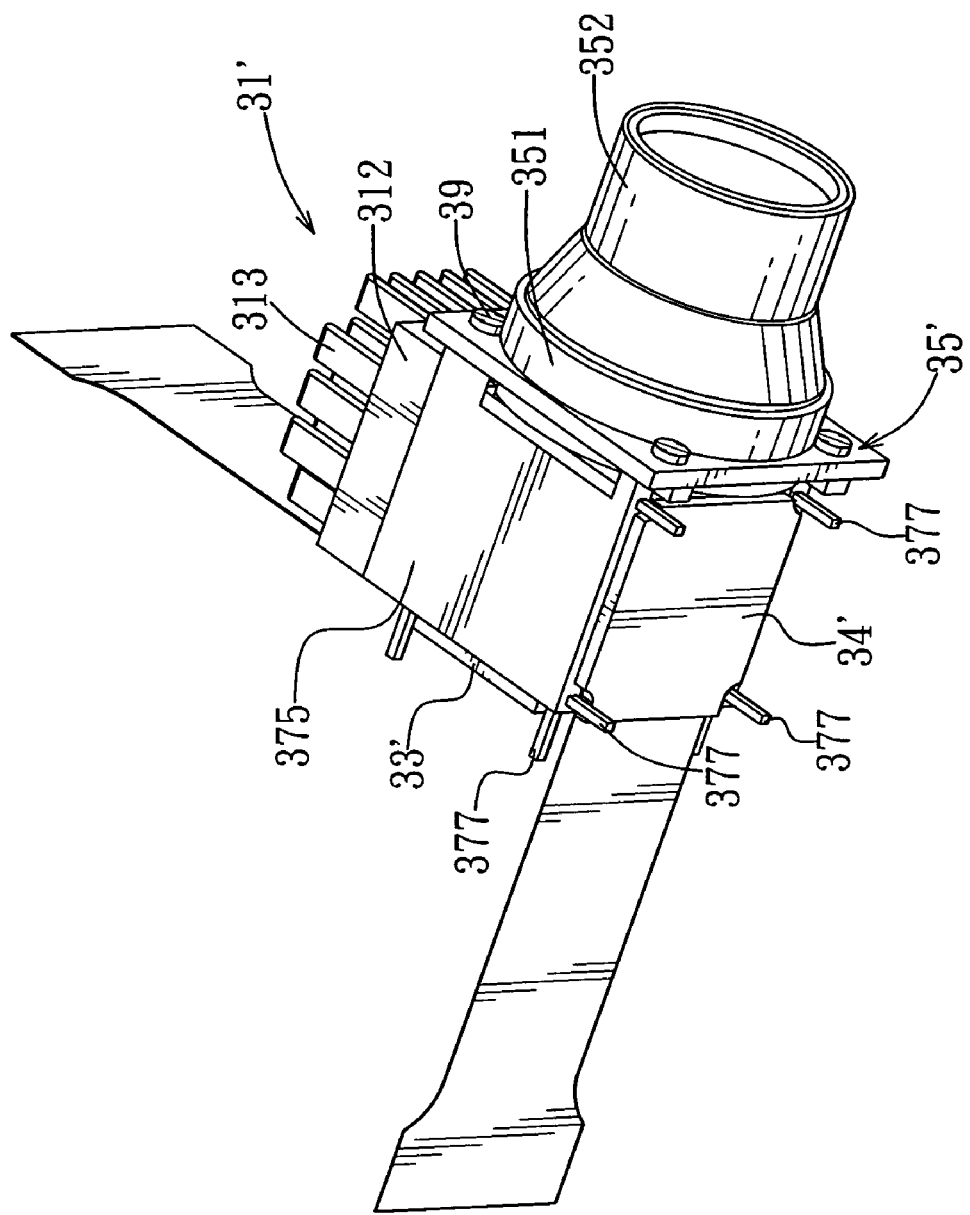
FIG. 4 is an assembled perspective view of the modified miniature projector module.

As shown in FIG. 3 and FIG. 4, a modified miniature projector module 3' according to the preferred embodiment of the present invention further includes a mounting seat 37 for securing components of the miniature projector module 3' together. The mounting seat 37 includes a light-entry side 371 having the light source unit 31' mounted thereto, a light-exit side 372 having the projector lens 35' mounted thereto, and first and second light-receiving sides 373, 374 having the first and second image modulators 33', 34' mounted thereto, respectively. The first and second light-receiving sides 373, 374 are transverse to each other and are respectively opposite to the light-exit and light-entry sides 372, 371. The polarization beam splitter 32' is disposed between the light-incident side 371 and the second light-receiving side 374.

In particular, the mounting seat 37 includes rectangular upper and lower plate bodies 375, 376 that are vertically spaced apart from each other. Each of the first and second image modulators 33', 34' is coupled to the upper and lower plate bodies 375, 376 at the corresponding one of the first and second light-receiving sides 373, 374. Each of the upper and lower plate bodies 375, 376 includes a plurality of fixers 377 for securing the first and second image modulators 33', 34'.

In this embodiment, each of the first and second image modulators 33', 34' is a reflective liquid crystal on silicon (LCOS) panel. The fixers 377 are in the form of pins that project from the upper and lower plate bodies 375, 376. Each of the first and second image modulators 33', 34' has a periphery 331, 341 formed with a plurality of notches 332, 342 to permit extension of the fixers 377 therein. The fixers 377 are preferably bonded to corresponding ones of the notches 332, 342 of the first and second image modulators 33', 34'.

Each of the upper and lower plate bodies 375, 376 is formed with a groove 378. The polarization beam splitter 32' is in the form of a plate having upper and lower plate edges 321, 322 that extend into the grooves 378 in the upper and lower plate bodies 375, 376, respectively. The grooves 378 extend along a diagonal direction in the upper and lower plate bodies 375, 376 such that the polarization beam splitter 32' forms a forty-five-degree angle with each of the first and second image modulators 33', 34'. In particular, the polarization beam splitter 32' has a first end 323 proximate to a junction of the light-entry side 371 and the light-exit side 372 of the mounting seat 37, and a second end 324 proximate to a junction of the first and second light-receiving sides 373, 374 of the mounting seat 37.

The light source unit 31' includes a semiconductor light-emitting member 311, a base 312, a plurality of heat-dissipating fins 313, and a condensing lens 314. The light-emitting member 311 generates the source light with the first and second polarizations, and is a light-emitting diode (LED) lamp in this embodiment. The base 312 has the light-emitting member 311 mounted thereto, and is mounted to the mounting seat 37 such that the light-emitting member 311 confronts the light-entry side 371 of the mounting seat 37. The heat-dissipating fins 313 are provided on the base 312, and are disposed opposite to the light-emitting member 311. The condensing lens 314 surrounds the light-emitting member 311, and is clamped between the upper and lower plate bodies 375, 376 at the light-entry side 371.

The miniature projector module 3' further includes first screw fasteners 38 for fastening the base 312 of the light source unit 31' to the upper and lower plate bodies 375, 376 of the mounting seat 37 at the light-entry side 371.

The projector lens 35' includes a lens-mounting ring 351 mounted to the mounting seat 37 at the light-exit side 372, and a lens unit 352 secured to the lens-mounting ring 351. The miniature projector module 3' further includes second screw fasteners 39 for fastening the lens ring 351 to the upper and lower plate bodies 375, 376 of the mounting seat 37 at the light-exit side 372.

Since the mounting seat 37 includes only the upper and lower plate bodies 375, 376, it is simple in structure, easy to manufacture, and saves space. Therefore, the miniature projector module 3' is suitable for use in a handheld electronic device so as to provide the handheld electronic device with image projection functionality.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A miniature projector module comprising:
   a light source unit capable of emitting source light with first and second polarizations;
   a polarization beam splitter capable of reflecting the source light with the first polarization, and permitting transmission of the source light with the second polarization therethrough;
   a first image modulator capable of converting the source light with the first polarization reflected by said polarization beam splitter into image light with the second polarization, and directing the image light with the second polarization toward said polarization beam splitter for further transmission therethrough;
   a second image modulator capable of converting the source light with the second polarization transmitted through said polarization beam splitter into image light with the first polarization, and directing the image light with the first polarization toward said polarization beam splitter for further reflection thereby;
   a projector lens disposed to receive and project the image light with the first and second polarizations from said polarization beam splitter; and
   a mounting seat that includes a light-entry side having said light source unit mounted thereto, a light-exit side having said projector lens mounted thereto, and first and second light-receiving sides having said first and second image modulators mounted thereto, respectively, said polarization beam splitter being disposed between said light-incident side and one of said first and second light-receiving sides.

2. The miniature projector module as claimed in claim 1, wherein said mounting seat includes upper and lower plate bodies that are vertically spaced apart from each other.

3. The miniature projector module as claimed in claim 2, wherein said first and second light-receiving sides of said mounting seat are transverse to each other and are respectively opposite to said light-exit and light-entry sides, each of said first and second image modulators being coupled to said upper and lower plate bodies.

4. The miniature projector module as claimed in claim 3, wherein each of said upper and lower plate bodies includes a plurality of fixers, said first and second image modulators being secured to corresponding ones of said fixers.

5. The miniature projector module as claimed in claim 4, wherein said fixers are in the form of pins that project from said upper and lower plate bodies.

6. The miniature projector module as claimed in claim 5, wherein each of said first and second image modulators has a periphery formed with a plurality of notches to permit extension of said fixers therein.

7. The miniature projector module as claimed in claim 6, wherein said fixers are bonded to corresponding ones of said notches of said first and second image modulators.

8. The miniature projector module as claimed in claim 3, wherein each of said upper and lower plate bodies is formed with a groove, said polarization beam splitter being in the form of a plate having upper and lower plate edges that extend into said grooves in said upper and lower plate bodies, respectively.

9. The miniature projector module as claimed in claim 8, wherein said grooves extend along a diagonal direction in said upper and lower plate bodies such that said polarization beam splitter forms a forty-five-degree angle with each of said first and second image modulators; and wherein said polarization beam splitter has a first end proximate to a junction of said light-entry side and said light-exit side of said mounting seat, and a second end proximate to a junction of said first and second light-receiving sides of said mounting seat.

10. The miniature projector module as claimed in claim 2, wherein said light source unit includes a condensing lens clamped between said upper and lower plate bodies at said light-entry side.

11. The miniature projector module as claimed in claim 2, further comprising screw fasteners for fastening said light source unit to said upper and lower plate bodies of said mounting seat at said light-entry side.

12. The miniature projector module as claimed in claim 2, further comprising screw fasteners for fastening said projector lens to said upper and lower plate bodies of said mounting seat at said light-exit side.

13. The miniature projector module as claimed in claim 2, wherein said light source unit includes a light-emitting member for generating the source light with the first and second polarizations, a base having said light-emitting member mounted thereto and mounted to said mounting seat such that said light-emitting member confronts said light-entry side of said mounting seat, and a plurality of heat-dissipating fins provided on said base and disposed opposite to said light-emitting member; said miniature projector module further comprising screw fasteners for fastening said base of said light source unit to said upper and lower plate bodies of said mounting seat at said light-entry side.

14. The miniature projector module as claimed in claim 2, wherein said projector lens includes a lens-mounting ring mounted to said mounting seat at said light-exit side, and a lens unit secured to said lens-mounting ring; said miniature projector module further comprising screw fasteners for fastening said lens ring to said upper and lower plate bodies of said mounting seat at said light-exit side.

15. The miniature projector module as claimed in claim 1, wherein said light source unit includes a light-emitting member for generating the source light with the first and second polarizations, a base having said light-emitting member mounted thereto and mounted to said mounting seat such that said light-emitting member confronts said light-entry side of said mounting seat, and a plurality of heat-dissipating fins provided on said base and disposed opposite to said light-emitting member.

16. The miniature projector module as claimed in claim 1, wherein each of said first and second image modulators is a reflective liquid crystal on silicon panel.

17. The miniature projector module as claimed in claim 1, wherein said light source unit includes a light-emitting diode lamp for providing the source light with the first and second polarizations.

18. The miniature projector module as claimed in claim 1, wherein said projector lens includes a lens-mounting ring mounted to said mounting seat at said light-exit side, and a lens unit secured to said lens-mounting ring.

\* \* \* \* \*